(12) United States Patent
Karcher et al.

(10) Patent No.: US 12,277,669 B2
(45) Date of Patent: *Apr. 15, 2025

(54) DEVICES, SYSTEMS AND METHODS FOR DIGITAL IMAGE ANALYSIS

(71) Applicant: NexGen Turf Research, LLC, Albany, OR (US)

(72) Inventors: Douglas Karcher, Fayetteville, AR (US); Carlin Purcell, Fayetteville, AR (US); Kenneth Hignight, Jefferson, OR (US)

(73) Assignee: NEXGEN Plant Science Center, LLC, Albany, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,900

(22) Filed: May 16, 2022

(65) Prior Publication Data

US 2022/0270206 A1 Aug. 25, 2022

Related U.S. Application Data

(63) Continuation of application No. 16/168,531, filed on Oct. 23, 2018, now Pat. No. 11,334,963.

(60) Provisional application No. 62/575,710, filed on Oct. 23, 2017.

(51) Int. Cl.
G06T 3/40 (2024.01)
G06T 7/00 (2017.01)
G06T 7/11 (2017.01)
G06T 7/90 (2017.01)
G06T 7/41 (2017.01)

(52) U.S. Cl.
CPC .............. *G06T 3/40* (2013.01); *G06T 7/0004* (2013.01); *G06T 7/11* (2017.01); *G06T 7/90* (2017.01); *G06T 7/41* (2017.01); *G06T 2207/30108* (2013.01)

(58) Field of Classification Search
CPC ... G06T 11/60; G06T 7/74; G06T 3/40; G06T 7/11; G06T 7/0004; G06T 7/41; G06T 7/90; G06T 7/2093; G06T 7/0044; H04N 5/23232

See application file for complete search history.

(56) References Cited

U.S. PATENT DOCUMENTS 11,334,963 B2 * 5/2022 Karcher .................... G06T 7/90
2008/0082426 A1 * 4/2008 Gokturk .............. G06F 16/5838
707/E17.014

(Continued)

OTHER PUBLICATIONS

Karcher et al., "Batch Analysis of Digital Images to Evaluate Turfgrass Characteristics", Crop Science, Jun. 24, 2005, pp. 1536-1539, vol. 45.

(Continued)

*Primary Examiner* — Phuoc H Doan
(74) *Attorney, Agent, or Firm* — Dentons Davis Brown; Kassandra Ricklefs (57) ABSTRACT

The disclosed devices, systems and methods relate to various devices, systems and methods related to objectively analyzing digital images of turfgrass to rate various parameters and to objectively measure overall quality. The system establishes thresholds and may execute a series of steps to determine green coverage, color, density, and uniformity. The system can scale images to determine uniformity.

20 Claims, 9 Drawing Sheets

(56) References Cited

U.S. PATENT DOCUMENTS

2014/0226900 A1* 8/2014 Saban .................... H04N 23/63
                                                    382/165
2017/0208248 A1* 7/2017 Mowry ................. G03B 17/00

OTHER PUBLICATIONS

Karcher et al., "Quantifying Turfgrass Color Using Digital Image Analysis", Crop Science, May 1, 2003, pp. 944-951, vol. 43.
Richardson et al., "Quantifying Turfgrass Cover Using Digital Image Analysis", Crop Science, Nov. 1, 2001, pp. 1884-1888, vol. 41.
Zhang et al., "Evaluation of Key Methodology for Digital Image Analysis of Turfgrass Color Using Open-Source Software", Crop Science, Mar. 1, 2017, pp. 550-558, vol. 57.

* cited by examiner

DEVICES, SYSTEMS AND METHODS FOR DIGITAL IMAGE ANALYSIS

CROSS-REFERENCE TO RELATED APPLICATION

This application is continuation of U.S. application Ser. No. 16/168,531, filed Oct. 23, 2019, and entitled "Devices, Systems and Methods for Digital Image Analysis," which claims priority to U.S. Provisional Application No. 62/575,710 filed Oct. 23, 2017 and entitled "Devices, System and Methods for Digital Image Analysis" each of which is hereby incorporated by reference in its entirety under 35 U.S.C. § 119(e).

TECHNICAL FIELD

The disclosed technology relates generally to a digital analysis platform, and in particular, to devices, systems and methods for processing digital images of turfgrass.

BACKGROUND

The disclosure relates to devices, systems and methods for analyzing digital images of turfgrass. In particular analyzing digital images to quantify various parameters of turfgrass and objectively evaluate overall turfgrass quality.

The ability to objectively quantify turfgrass parameters and overall quality is important for turfgrass scientists. Turfgrass quality can be determined by the combined effects of coverage, color, density, and uniformity.

Digital photography has become a common and affordable means for the scientific community to document and present images. Through digital photographs, researchers can instantaneously obtain millions of bits of information on variously sized plots of turfgrass from very small to very large. Each pixel in an image contains color information about the area captured by that pixel.

Currently turfgrass quality is determined subjectively by turfgrass scientists. Alternatively, SigmaScan™ software can be used to determine coverage and color. Subjective determinations of turfgrass quality are undesirable because there is no standardization and each individual may rate quality parameters differently creating difficulty in comparing quality across time and different areas. SigmaScan™ has many disadvantages including that it only quantifies ground coverage and color and is slow at processing images. Further, the existing software is inadequate because it leaves out parameters for turfgrass quality analysis and is not able to calculate overall quality.

There is a need in the art for a system to objectively determine coverage, color, density, and uniformity of turfgrass from a digital image. It is further desirable to provide a system to objectively measure and quantify overall turfgrass quality from various parameters. It is further desirable to provide a system for determining turfgrass parameters and overall quality quickly.

BRIEF SUMMARY

This disclosure relates to devices, systems and methods for objectively analyzing turfgrass through digital images, specifically by objectively measuring various turfgrass parameters and creating an objective analysis of overall turfgrass quality. Described herein are various embodiments relating to devices, systems, and methods for improving turfgrass analysis.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The turfgrass analyzing system disclosed herein is capable of determining various parameters from a digital image including green coverage, color, density, and uniformity, determining overall turfgrass quality, utilizing a frame within an image to define the area to be analyzed, and performing analysis of a large plot.

Some embodiments include corresponding computer systems, apparatus, and computer programs recorded on one or more computer storage devices, each configured to perform the actions of the methods.

Implementations may include one or more of the following features. A turfgrass analyzing system comprising a storage device for storage of digital images and a processor for analyzing digital images wherein the processor is configured and arranged to analyze a defined set of parameters. The storage device containing an image of turfgrass. The system wherein threshold values can be set to remove pixels from the image of turfgrass. The system wherein the image contains a frame of contrasting color. The system wherein the defined set of parameters includes green coverage, color, density, and uniformity. The system wherein overall turfgrass quality is determined from a weighted average of the defined set of parameters.

Some implementations may include one or more of the following features. A method comprising obtaining a digital image of turfgrass, receiving by a storage device the digital image, retrieving by a processor the digital image from the storage device, and processing by the processor the digital image to determine a defined set of parameters. The method wherein the defined set of parameters includes green coverage, color, density, and uniformity. The method further comprising determining overall quality from the defined set of parameters. The method wherein green coverage is determined by setting a set of threshold values, removing pixels outside of the set of threshold values, determining the number of green pixels relative to the total number. The method wherein color is determined by calculating the average DGCI value for the image. The method wherein density is determined by determining the number of shadows in the digital image. The method wherein uniformity is determined by scaling the digital image, grouping areas of similar color in the scaled image, and comparing the size of the areas of similar color to the digital image.

One general aspect includes a computing device comprising a storage device, a processor, and a display wherein the processor retrieves a digital image from the storage device, the processor is configured to calculate turfgrass quality from the digital image, and the processor displays on the display the digital image and turfgrass quality. The device wherein the digital image contains a frame of a color in contrast to green. The device wherein turfgrass quality is determined by a weighted average of measurements of green coverage, color, density, and uniformity. The device wherein green coverage is determined by setting a set of threshold values, removing pixels outside of the set of threshold values, determining the number of green pixels relative to the total number. The device wherein color is determined by calculating the average DCGI value for the image. The device wherein density is determined by determining the number of shadows in the digital image. The device wherein uniformity is determined by scaling the digital image, grouping areas of similar color in the scaled image, and comparing the size of the areas of similar color to the digital image.

One or more computing devices may be adapted to provide desired functionality by accessing software instructions rendered in a computer-readable form. When software or applications are used, any suitable programming, scripting, or other type of language or combinations of languages may be used to implement the teaching contained herein. However, software need not be used exclusively, or at all. For example, some embodiments of the devices, methods and systems set forth herein may also be implemented by hard-wired logic or other circuitry, including but not limited to application-specific circuits. Firmware may also be used. Combinations of computer-executed software, firmware and hard-wired logic or other circuitry may be suitable as well.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The various embodiments disclosed or contemplated herein relate to improved devices, systems and methods for analyzing digital images, specifically of turfgrass. Some earlier processes for digitally analyzing turfgrass are described by Karcher, D. E., and M. D. Richardson. 2003. Quantifying Turfgrass Color Using Digital Image Analysis. Crop Sci. 43:943-951. doi:10.2135/cropsci2003.9430 and Richardson, M. D., D. E. Karcher, and L. C. Purcell. 2001. Quantifying Turfgrass Cover Using Digital Image Analysis. Crop Sci. 41:1884-1888. doi:10.2135/cropsci2001.1884, which are hereby incorporated by reference for all purposes.

The disclosed devices, systems and methods relate to a system capable of objectively analyzing digital images of turfgrass to rate various parameters and overall quality. The devices, systems and methods discussed herein are merely illustrative and are not to be interpreted as limiting in scope. While the various devices, systems and methods are described herein as a "system" this reference is made for brevity, rather than to limit the scope of any particular embodiment.

The various implementations of the disclosed system, devices and methods are constructed and arranged to process digital images for turfgrass quality parameters, including green coverage, color, density, uniformity and the like. Other parameters are of course possible. The system contains a Java application in certain implementations, but can also include various other types of applications or platforms, as would be known to those of skill in the art. In certain implementations, the program optionally runs on Windows, Mac, and Linux operating systems, but could be used in conjunction with other operating systems as would be known.

In various implementations, the system allows for the objective quantification of turfgrass quality via digital image analysis. The system gives a measure of turfgrass quality of an image by performing each of the following analyses according to certain implementations, linearly interpolating the results to a user-specified scale, and calculating a weighted average of the scaled results. This weighted average is a measure of quality according to these implementations. Further details and description are found below. In various implementations, a series of steps are performed, which can be executed in any order.

Figure 1A:
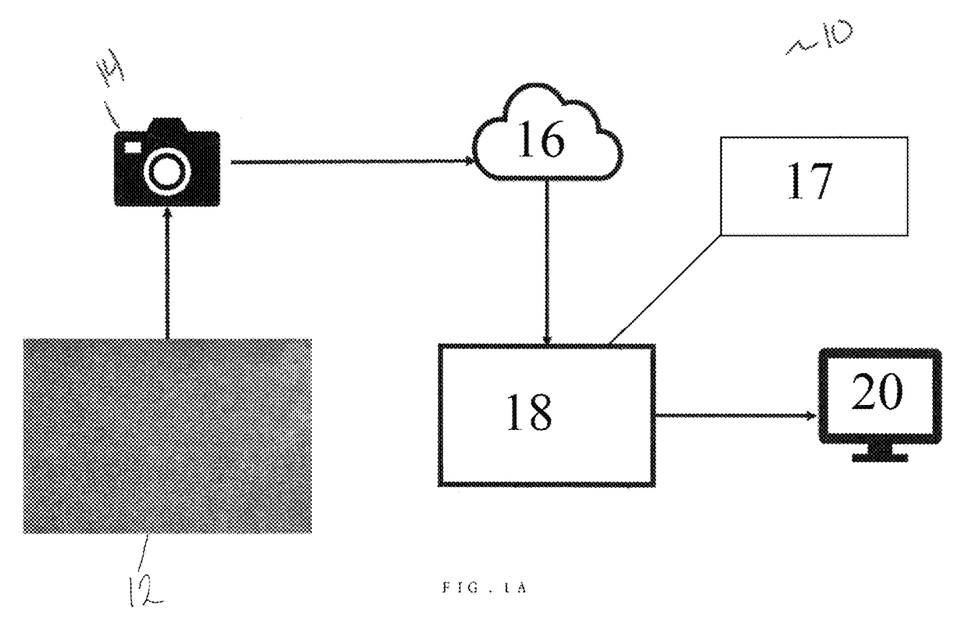
FIG. 1A is a schematic diagram of the system, according to one implementation.
Figure 1B:
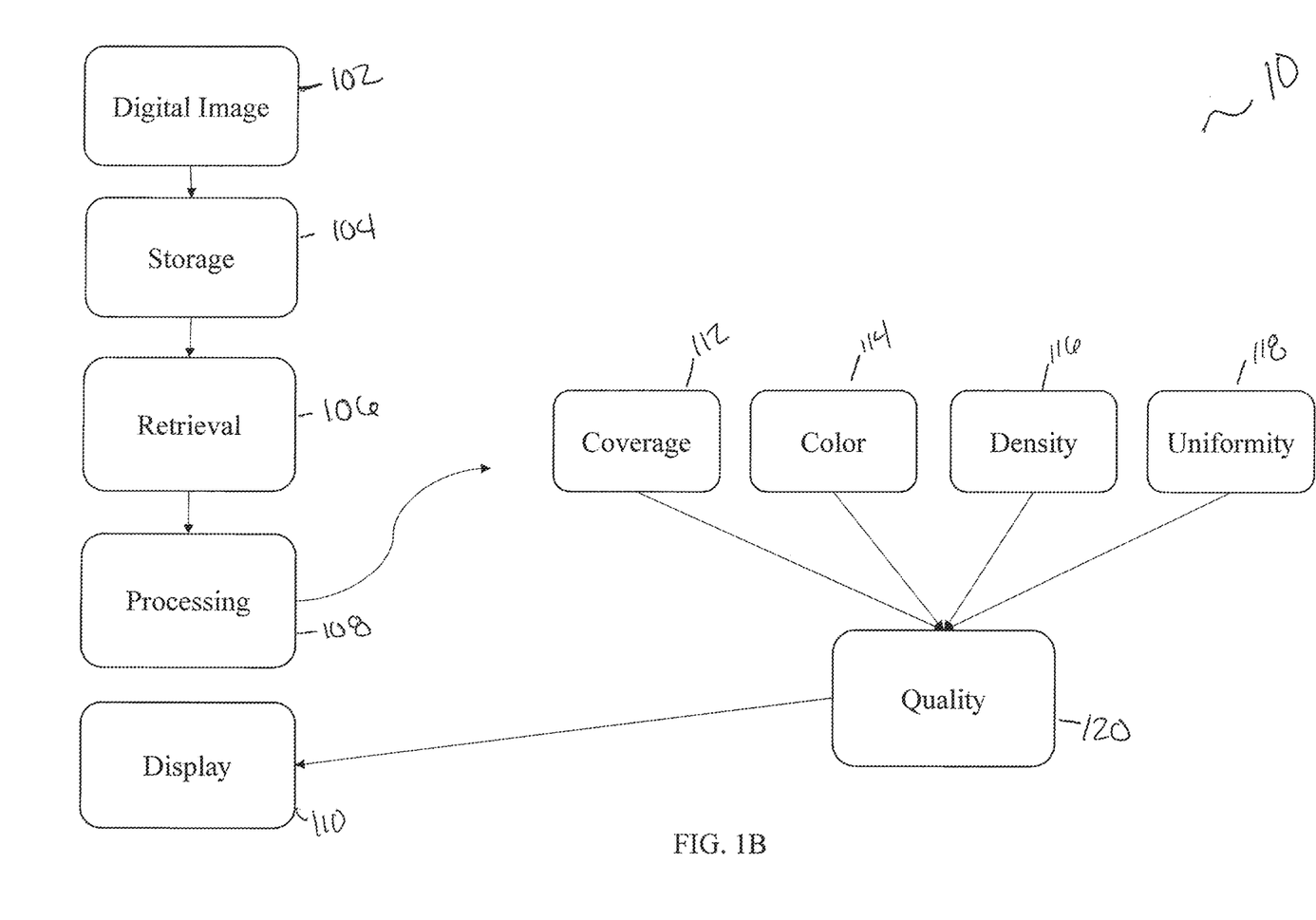
FIG. 1B is a schematic diagram of the system, according to one implementation.

Turning to the drawings in greater detail, exemplary implementation of the system 10 are shown in FIGS. 1A and 1B. In one implementation, in one step a digital image 12 of turfgrass is taken (box 102), creating a digital image. In various implementations, the digital image 12 can be taken by a digital camera 14 or other photography device as would be understood by those of skill in the art.

In another step, the digital image 12 is stored (box 104) in a storage device 16, such as an in-camera memory card, cloud-based storage, or other storage device as would be known in the art.

In another step, a processor 18 retrieves (box 106) the desired image or images from the storage device 16.

In another step, the processor 18 processes (box 108) the digital image on a pixel-by-pixel level to obtain various parameters from the digital image 12 such as coverage (box 112), color (box 114) and density (116).

In certain implementations, in an additional step, the processor 18 may further determine overall turfgrass quality (box 120) via comparison to a standard.

Figure 5:
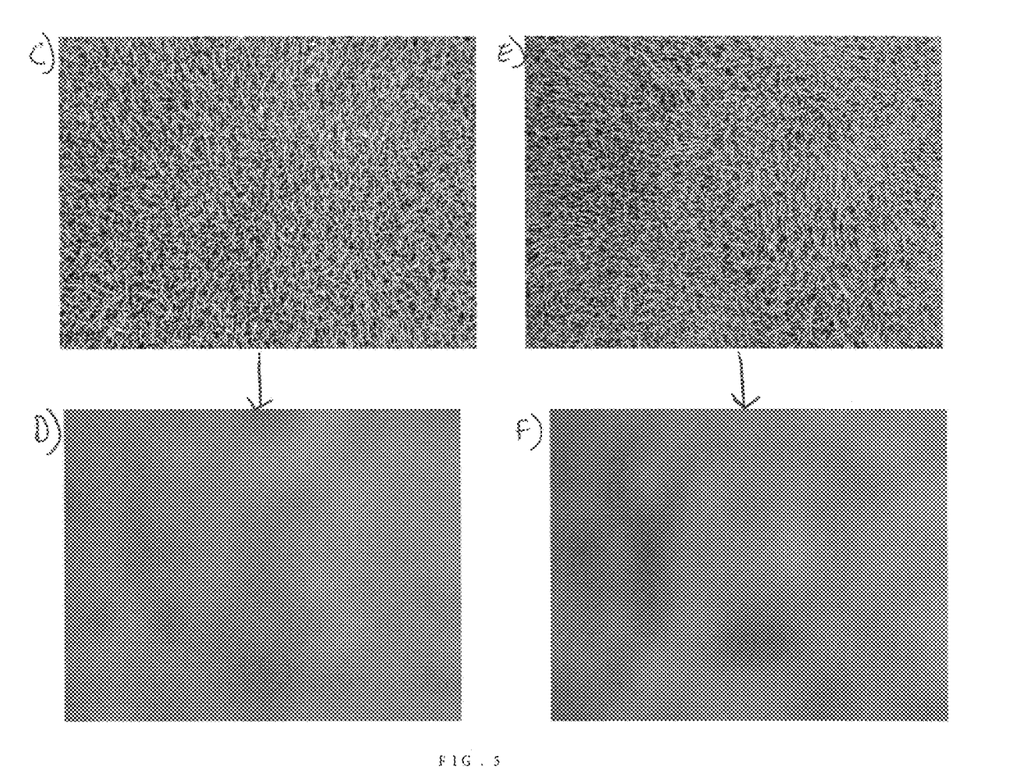
FIG. 5 is a depiction of uniformity analysis, according to one embodiment.

In yet further implementations, in an additional step, the image 12 is scaled—as discussed below in relation to FIG. 5—and uniformity is established via the scaled images (box 118).

In a further optional step, the system 10 may additionally include a display 20 to display (box 110) the digital image 12, parameters, overall quality to a user, and/or other values to a user.

It is understood that the information contained in each digital image includes the amount of red, green, and blue light ("RGB") light emitted for each pixel in the digital image. To ease the interpretation of digital color data, RGB values can be converted directly to hue, saturation and brightness ("HSB") values that are based on human perception of color. For example, in HSB color descriptions hue is defined as an angle on a continuous circular scale from 0° to 360° (0°=red, 60°=yellow, 120°=green, 180°=cyan, 240°=blue, 300°=magenta), saturation is the purity of the color from 0% (gray) to 100% (fully saturated color), brightness is the relative lightness or darkness of the color from 0% (black) to 100% (white).

Returning to the implementation of FIG. 1A, the processor 18 can determine green coverage of turfgrass from a digital image 12 (also show in FIG. 1B boxes 108 and 112). To analyze green coverage, the processor determines, the hue, saturation, and brightness ("HSB") for each pixel of the digital image 12 from the RGB values using a standard process known to those of skill in the art.

For the processor 18 to analyze the image for green coverage threshold settings must be set. Threshold settings include HSB ranges. A user may select various ranges of HSB such that any pixel that has an HSB value within the selected range will be included in the processing. Any pixel outside of the selected HSB ranges will not be included in the processing. As such, ranges should be selected to include only those pixels that the user wants to evaluate. For example, a user may select threshold ranges such that only those pixels that contain green turfgrass will be included in the analysis and exclude pixels capturing soil or other debris.

The system 10 may include default threshold settings, for example hue 70°-170°, saturation 10%-100% and brightness 0%-100%. If no default settings are provided or customization is desired the system 10 may allow for selecting various HSB ranges as desired. The threshold settings may be adjusted for a variety of reasons including to correct for camera or lighting effects.

Figure 2A:
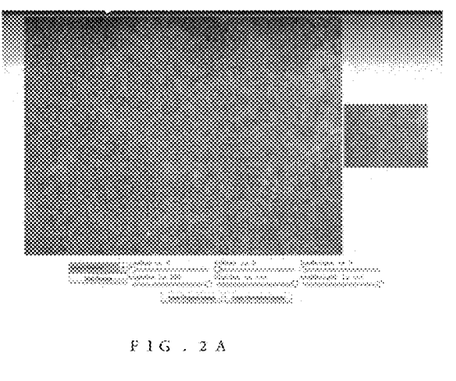
FIG. 2A is a depiction of the display showing an original image, according to one embodiment.
Figure 2B:
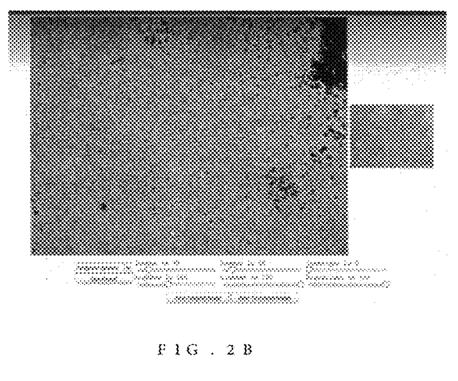
FIG. 2B is a depiction of the display showing the original image of FIG. 2A with threshold settings applied, according to one embodiment.

As shown in FIG. 2B, if the threshold settings are unknown, the HSB ranges can be varied and the system 10 may be configured to turn any pixel not within the ranges black. FIG. 2A, shows the digital image in its original state. FIG. 2B shows the digital image with the threshold settings applied such that the pixels in the image that are outside the selected ranges have been blacked out. Once the appropriate threshold levels are determined the analysis can be completed. As described above, pixels that are outside of the threshold ranges will not be included in the analysis. The process of blacking out the pixels outside of the threshold ranges and displaying the image with the blacked out pixels allows for quick and easy fine tuning of the threshold ranges in order to obtain a more accurate analysis.

Figure 3:
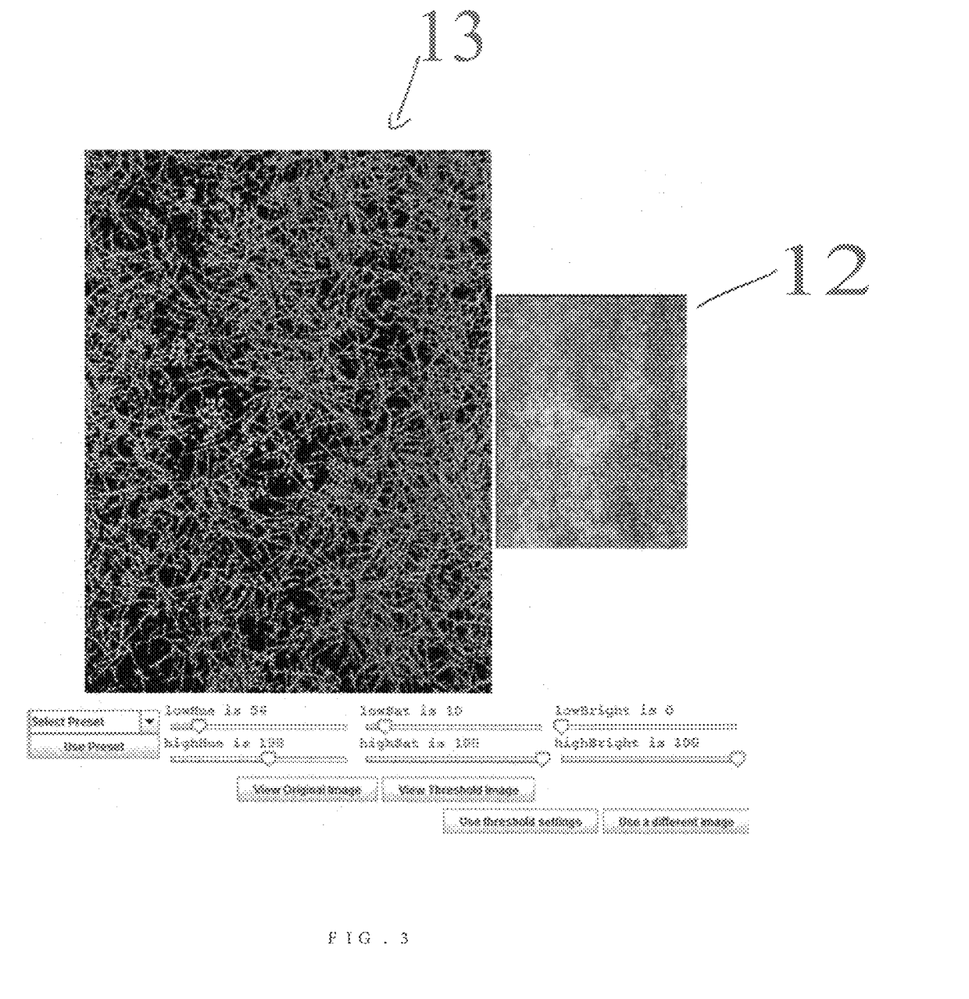
FIG. 3 is an exemplary embodiment of the system selecting threshold values, according to one embodiment.

In other implementations, such as the implementation shown in FIG. 3, the system 10 can display the original digital image 12 simultaneously with the image with threshold settings applied and appropriate pixels blacked out. The system 10 can be configured in various ways to allow for the appropriate threshold values to be selected. In some implementations, the system 10, allows for a user to zoom in on a digital image 12 to better fine tune the threshold settings. The zoomed in image 13 may be displayed next to the original digital image 12.

In various implementations of the system 10, green coverage is determined by the number of pixels within the image that are within the selected HSB values for green turfgrass compared to the total number of pixels. An analysis of coverage can be used to quantify seedling or spring establishment, drought resistance, pest resistance, and/or spring green-up. Green coverage also provides a part of the overall quality analysis.

The system 10 can objectively analyze the color of the turfgrass by determining the average color of the image (shown in FIG. 1B box 114). The average color of the image may be determined using the dark green color index ("DGCI"). For example, high DGCI values generally correspond to healthy turf with relatively high chlorophyll content as well as turf cultivars with dark genetic color. In some embodiments, the system 10 can perform color analysis for the entire image. In other embodiments, the system 10 can use the threshold ranges as described above to calculate average color using only the desired pixels within the image. For example, a user may select threshold values such that the analysis will only capture those pixels representing green turfgrass while excluding pixels capturing dirt, soil, or other non-turfgrass particles.

The system 10 can quantify the density of turfgrass from a digital image 12 (shown in FIG. 1B box 116). Density is a measure of the number of plants per unit area. The system 10 determines density using shadows in the digital image 12. A shadow is defined as a group of bordering dark pixels. Dark pixels are defined by a HSB threshold, that can be selected and varied by a user or preset within the system 10. A high number of shadows indicates a high density, while a low number of shadows indicates a low density. Specifically, as would be appreciated by the skilled artisan, more dense turfgrass would have many non-contiguous shadows, whereas less dense turfgrass will have fewer but larger shadows. Turf density is an indicator of overall turf health and aesthetic quality. Density analysis can be used to quantify genetic improvements in turf cultivars.

Exemplary threshold ranges for selecting shadows or dark pixels are hue: 0-360°, saturation: 0-100%, and brightness: about 0-about 23%. Other ranges may be selected as necessary for the digital image to be analyzed. For optimal image analysis, all images should be taken under standardized conditions, such as the same height, lighting, and camera settings.

Figure 4:
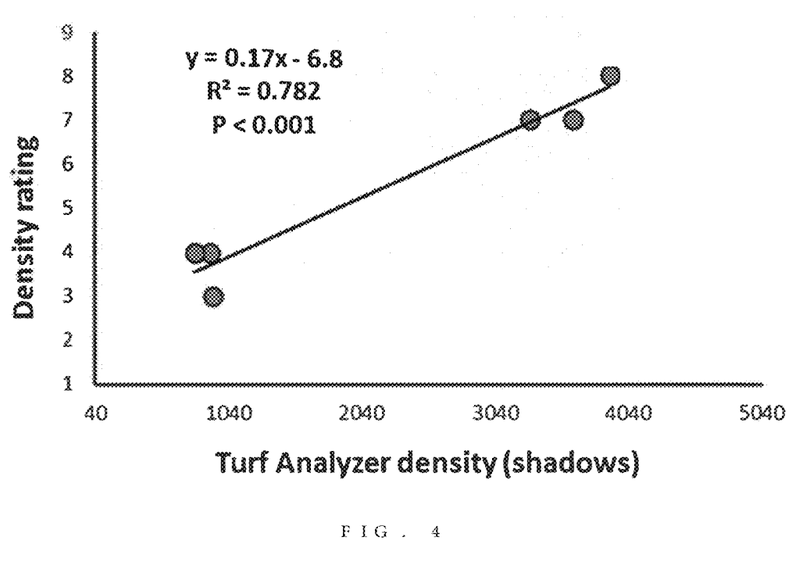
FIG. 4 is a graph depicting density ratings.

FIG. 4 shows a linear regression of the number of shadows found in a digital image 12 and a corresponding visual density rating on a scale from 1-9. As shown in FIG. 4, there is a high correlation between the number of shadows as determined by the system 10 and a visual rating of density. A lower number of shadows yields a lower rating, while a higher number of shadows yields a higher density rating.

In one step, the system 10 determines uniformity from the digital image 12 (FIG. 1B box 118). The system 10 processes the digital image 12 on the processor 18 to determine the percentage of the digital image 12 having the same or similar color and thereby determine uniformity. The uniformity of turfgrass corresponds to how the turfgrass appears from a distance. A low resolution digital image can give an approximation of how turfgrass would appear from a distance (seen in FIGS. 5D and 5F).

In one step, the processor 18 retrieves a digital image 12 from the storage device 16. The processor 18 scales the digital image 12 (FIG. 5C and in 5E), for example to a thumbnail size. In some implementations, the image 12 is scaled such that there are approximately 12.62 pixels per foot, while other ratios are contemplated. The scaling of the image may be done iteratively. Iterative scaling may be used to create a scaled image that more accurately represents the original, such as to create a smooth final image without noise.

In some implementations, iterative scaling may consist of a series of steps. In one step, a processor 18 calculates the ideal dimensions for a scaled image. In another step, the digital image 12 is scaled by using a scale factor to reduce the pixel height and width by the selected scale factor. The step of scaling the image 12 using a scale factor is repeated until the image reaches the desired pixel height and width.

In another step, the system 10 may blur the image. The processor 18 may slightly darken any extremely bright or white pixels.

The processor 18 then partitions the image into contiguous regions of similar color. In some implementations, contiguous regions of similar color are determined using a label buffer of the same size and dimension as the scaled image. Similar color may be defined using the deltaE2000 color distance metric, or other metric known to those of skill in the art. In some implementations, two pixels will be considered to have a similar color if their deltaE2000 color distance is less than about 1.4, while other values may also be used.

For each contiguous region of similar color the average color is calculated.

In another step the processor 18 groups the contiguous regions of similar color together based on similarity of their average color. Similarity of average color may be determined using the deltaE2000 color distance metric. For example, groups could be considered to have similar average color if their deltaE2000 color distance is less than about 19, while other values are contemplated.

In another step the processor 18 may determine the largest grouping of contiguous regions of similar color. In another step, a percentage corresponding to uniformity is determined by taking the number of pixels in the largest grouping of contiguous regions of similar color and dividing by the number of pixels of the whole scaled image.

Uniformity estimates the consistency of a turf canopy's appearance when viewed from standing above the surface. Turf uniformity is a measure of overall plant health and cultivar purity within the canopy. Uniformity also plays a role in aesthetic turf quality.

A low percentage of uniformity corresponds to the largest region of similar color being small relative to the entire image and may result in a low uniformity rating. A high percentage of uniformity corresponds to the largest region of similar color being large relative to the entire image and may result in a high uniformity rating. A high uniformity rating may correspond to high overall plant health and cultivar purity.

Figure 6:
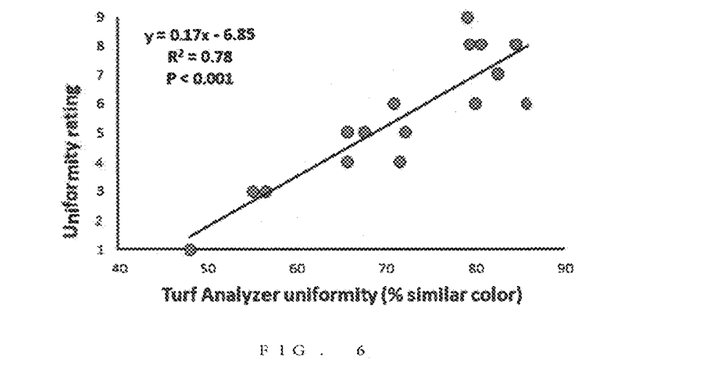
FIG. 6 is a graph depicting uniformity ratings.

FIG. 6 shows a linear regression of the uniformity percentage as calculated by the system 10 and visual uniformity ratings on a scale of 1 to 9. The system 10 determination of uniformity has a high correlation with visual uniformity ratings.

The system 10 can be used to quantify overall turfgrass quality (FIG. 1B box 120). Using combined analyses of color, coverage, density and/or uniformity overall turfgrass as described herein, overall quality can be determined. In one step, the values determined for color, coverage, density and/or uniformity are converted to rating values, such as by linear interpolation (see FIG. 7). Rating values may be on a scale from 1 to 9, but other scales may be used. The rating scale of 1 to 9 is well understood in the art. A weighting scale may be selected by a user to correspond to the parameters considered most, least, and/or equally important to overall quality by that user. A weighted average of those values can then be determined according to a weighting scale selected by the user.

Figure 7:
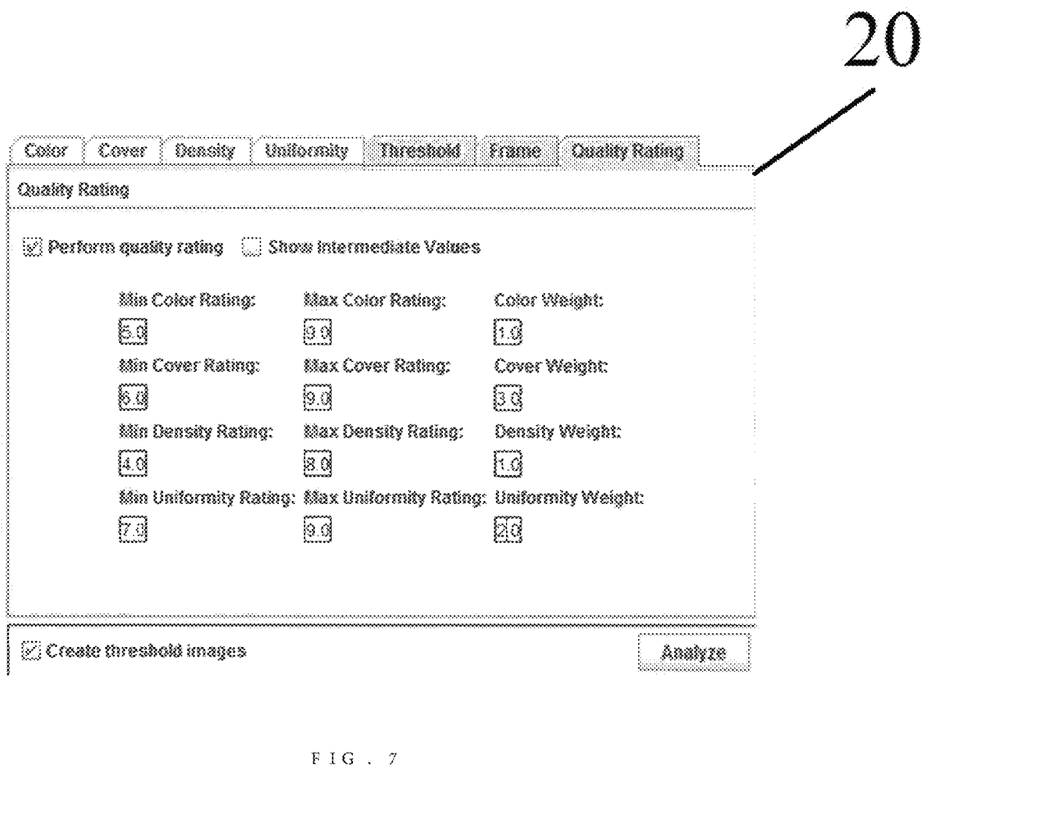
FIG. 7 is an exemplary embodiment of the display for setting weights when determining overall quality.

FIG. 7 shows an exemplary display 20 for inputting weighting scale values. A user inputs a maximum and minimum value rating for each parameter to be considered in the overall quality analysis. For example each parameter (coverage, color, density, and uniformity) can be set on a scale from 1 to 9, or any other numerical scale as desired. The user can select the weight to be given to each parameter. For example if each parameter has equal weight a value of 1 can be entered for all parameters. In another example, if coverage has twice the importance of color, density, and uniformity in determining overall quality a value of 2 should be entered for coverage, while a value of 1 should be entered for all other parameters.

The processor 18 using the values inputted by the user can calculate overall quality. The system 10 may be configured to generate a read out of the intermediate parameter values, the corresponding parameter ratings, and the overall quality rating for each digital image 12 processed.

Figure 8A:
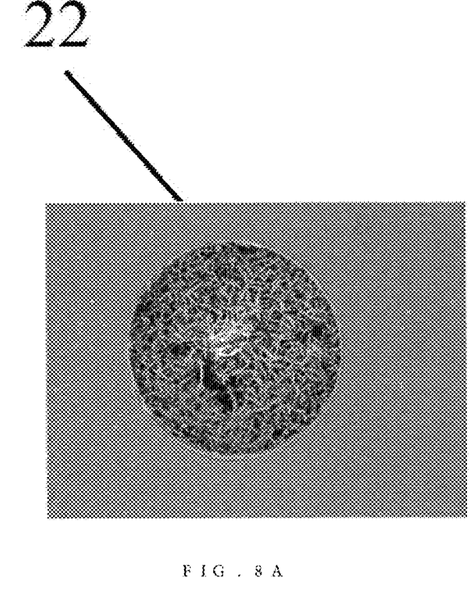
FIG. 8A is an exemplary original image of turfgrass within a frame.
Figure 8B:
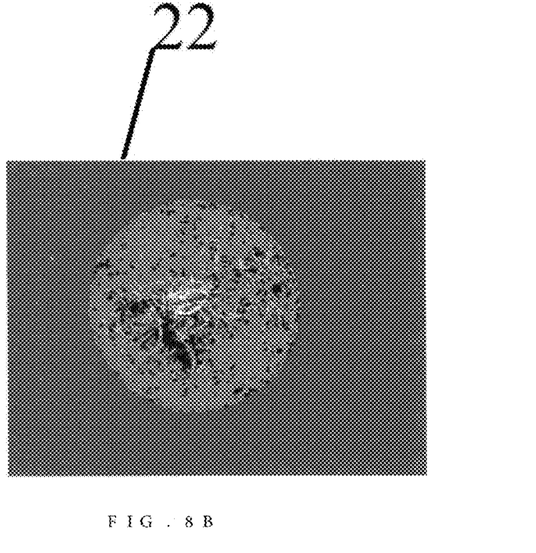
FIG. 8B is an depiction of FIG. 9A after applying frame values.
Figure 9:
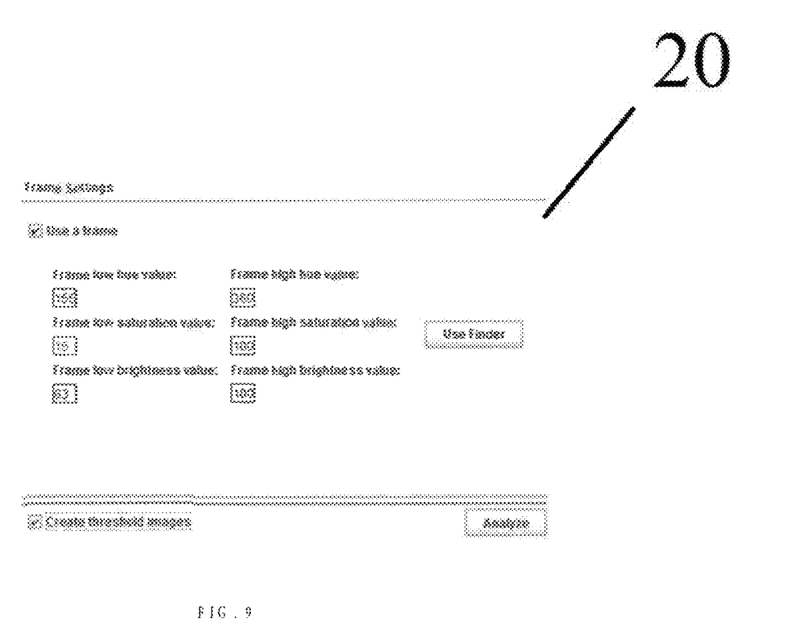
FIG. 9 is an exemplary implementation of the display setting frame values for frame analysis.

As shown in FIGS. 8A-B and 9, the system 10 may analyze turfgrass within frame or a portion of a digital image. Frame analysis can be useful for analyzing small areas or non-rectangular areas. Examples of small or non-rectangular areas include but are not limited to greenhouse pots, ball marks, divots and lysimeters.

As seen in FIG. 8A, to conduct this analysis a frame 22 is included around the turfgrass area of interest within the digital image 12. The digital image 12 should include only the turfgrass area to be analyzed and the frame 22. The frame 22 must be of a color that contrasts with the color of the turf and/or soil within the digital image 12. Examples of colors contrasting with turf and soil include but are not limited to pink and purple. The frame 22 may be constructed of various materials including poster board or cardstock, while other materials could be used.

FIG. 9 shows an exemplary implementation of the display 20 for setting frame threshold values. The system 10 allows for selecting the HSB values for the frame 22 such that the frame 22 will be excluded from the analysis, shown in FIG. 8B. If the HSB values for the frame 22 are unknown the frame threshold values can be determined by varying the parameters until the pixels of the frame turn black, similar to the process for selecting threshold ranges for green turfgrass described above. Additionally, the frame analysis allows for selecting threshold values such that only pixels representing turfgrass within the frame 22 are included in the analysis, see FIG. 8B. The non-turfgrass pixels within the frame 22 may also be excluded from the analysis.

In certain implementations a machine learning model is used to identify characteristics of turfgrass and establish parameters, ratings and thresholds, and can be used to revise the other systems, methods and devices described herein, such as by refining the ratings, thresholds and standards (described in relation to FIGS. 2, 3, 5, and 7-9) to improve accuracy of the system 10. In these implementations, a model is used to associate digital image data within a computing machine, such as a server 17 or database 17.

Generally, the various machine learning approaches, may be coded for execution on the processor 18, server 17, a database 17, third party server or other computing or electronic storage device in operable communication with the processor 18.

The model may be executed on data recorded or otherwise gathered from digital images 12. In various implementations, the data may include, but is not limited to, one or more of the following: expert rating for parameters such as coverage, color, density, and uniformity; and output from the system under various sets of inputs such as HSB thresholds to determine pixels corresponding to green turfgrass.

Accordingly, the system 10 and methods using the machine learning model may send and/or receive information from various computing devices, as well as a database or other collection of representative turfgrass images across various cultivars, taken under controlled lighting conditions by way of a gateway or other connection mechanism. In certain embodiments, the systems and methods may utilize image data in combination with expert ratings and corresponding inputs to improve accuracy of the evaluation performed in conjunction with the system 10, and associated devices and methods.

In various implementations, image data may also be loaded onto any of the computer storage devices of a computer to generate an appropriate tree algorithm or logistic regression formula. Once generated, the tree algorithm, which may take the form of a large set of if-then conditions, may then be coded using any general computing language for implementation. For example, the if-then conditions can be captured and compiled to produce a machine-executable model, which when run, accepts new image data and outputs results which can include adjusted maximum and minimum standards for various parameters. In various implementations, these results can be re-introduced into the learning model to continually improve the functions of the system 10, including updating the various maximum and minimum standards and thresholds used throughout. It is understood that these implementations are also able to trend the respective data values and readings to improve the performance of the system 10, devices and methods.

For the analyses, multithreading may be implemented to extend the application of the system 10 and decrease execution time. The system 10 operates at least two orders of magnitude faster than prior systems such as SigmaScan®. Said another way the system 10 may process images in $\frac{1}{100}$th of the time of prior systems while performing more analyses including coverage, color, density, uniformity, and overall quality. The system 10 works faster by leveraging multicore technology to analyze multiple images at once, decreasing processing time.

The system 10 may be configured such the analyses of coverage, color, and density can be processed at the simultaneous requiring only one scan of the pixels of the digital image 12. Prior systems require multiple scans of the pixels of an image to receive readings on more than one parameter.

The system 10 is a technical improvement over prior systems by processing analyses of density and uniformity along with coverage and color. The system 10 additionally can process an aggregate measure of quality, described above that was not possible prior. Also, the system 10 processes images in less time.

EXAMPLES

Figure 10:
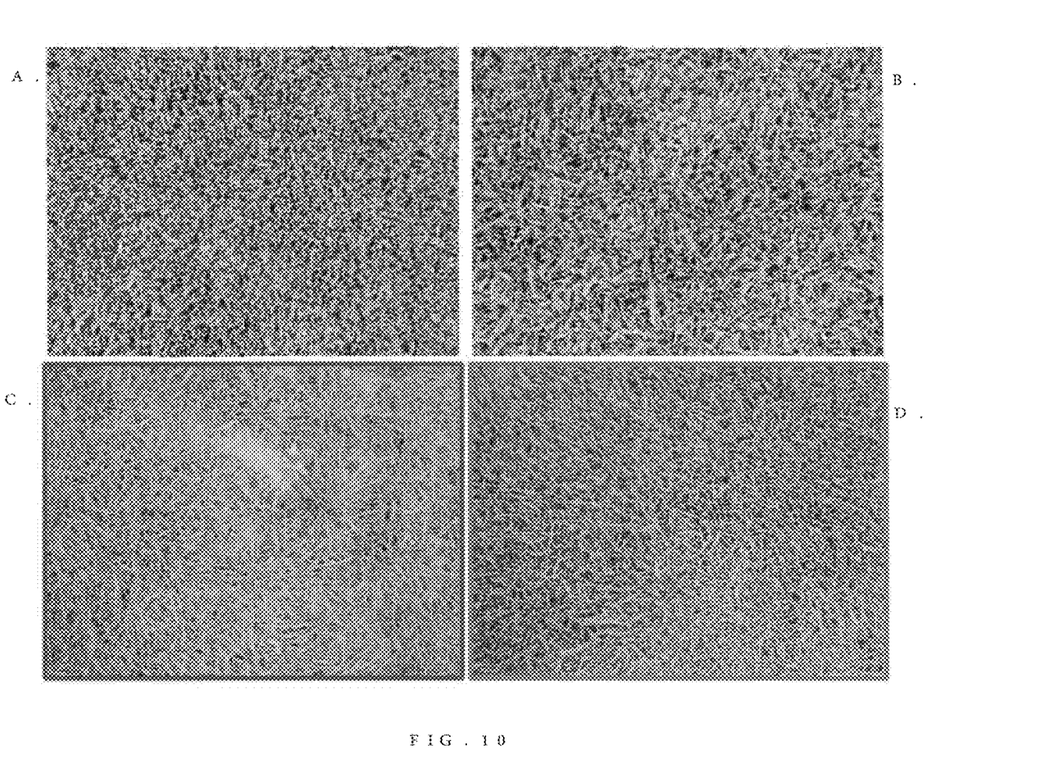
FIG. 10 contains various exemplary photographs of turfgrass.

FIG. 10 contains multiple images A-D of turfgrass that can be processed using the above described analyses. The coverage, color, density, and uniformity for these digital images of FIG. 10A-D can be processed on the processor 18. One step is to select the appropriate threshold values as described above, in this example hue 55-140, saturation 10-100, and brightness 0-100 were used.

To measure overall quality a user may enter the maximum and minimum rating values as desired. In this example, rating ranges were set to cover 3-9, color 4-8, density 4-8, and uniformity 2-8. The weight to be given to each selected variable may also be chosen. In this example, weights were set to cover 4, color 1, density 2, and uniformity 3.

A coverage analysis was performed using the above described system 10 and process. Turning to FIG. 10, a percent cover and a cover quality rating were processed for each image A-D. FIG. 10A, percent cover 98.35 and cover quality rating 8.68. FIG. 10B, percent cover 95.86 and cover quality rating 8.16. FIG. 11C, percent cover 71.41 and cover quality rating 3.00. FIG. 10D, percent cover 99.85 and cover quality rating 9.00.

A color analysis was performed on each of the digital images of FIG. 10 corresponding to the above described system 10. FIG. 10A color rating 7. FIG. 10B color rating 4.49. FIG. 10C color rating 4.00. FIG. 10D color rating 8.00.

A density analysis was performed on each of the digital images of FIG. 10, corresponding to the above described system 10. FIG. 10A density rating 8.00. FIG. 10B density rating 4.49. FIG. 10C density rating 4.00, FIG. 10D density rating 4.43.

A uniformity analysis was performed for each of the digital images of FIG. 10 corresponding to the above described system 10. FIG. 10A uniformity rating 8.00. FIG. 10B uniformity rating 5.74. FIG. 10C uniformity rating 3.36. FIG. 10D uniformity rating 2.00.

The processor 18 may use the parameters of coverage, color, density, and uniformity as well as weighting values to determine the overall quality of the turfgrass in each digital image, as described above. FIG. 10A overall quality 8.17. FIG. 10B overall quality 6.36. FIG. 10C overall quality 3.41. FIG. 10D overall quality 5.89.

Although the disclosure has been described with reference to preferred embodiments, persons skilled in the art will recognize that changes may be made in form and detail without departing from the spirit and scope of the disclosed apparatus, systems and methods.

What is claimed is:

1. A turfgrass analyzing system comprising:
(a) a storage configured for storage of one or more digital images, each digital image comprising a green coverage parameter, a color parameter, a density parameter, and a uniformity parameter; and
(b) a processor in communication with the storage device, wherein the processor is constructed and arranged to analyze green coverage, color, density of turfgrass, and uniformity in each digital image.

2. The system of claim 1, further comprising a set of threshold values selected to identify pixels containing turfgrass.

3. The system of claim 2, wherein the set of threshold values can be set to remove pixels from the one or more digital images of turfgrass.

4. The system of claim 2, wherein each of the one or more digital images of turfgrass contains a contrasting frame.

5. The system of claim 2, further comprising a database in communication with the processor and wherein the system is constructed and arranged to execute machine learning on data stored in the database.

6. The system of claim 5, wherein overall turfgrass quality is determined from a weighted average of the green coverage, color, density of turfgrass, and uniformity.

7. A method for digital image analysis comprising:
receiving a digital image of turfgrass comprising a green coverage, a color, a density of turfgrass, and a uniformity;
retrieving by a processor the digital image;
processing on the processor the digital image by executing one or more steps to determine green coverage, color, density of turfgrass, and uniformity within the digital image.

8. The method of claim 7, further comprising scaling the digital image.

9. The method of claim 8, further comprising determining overall turfgrass quality from the green coverage, color, density of turfgrass, and uniformity.

10. The method of claim 7, wherein green coverage is determined by:
 setting a set of threshold values;
 removing pixels outside of the set of threshold values; and
 determining the number of green pixels relative to the total number of pixels.

11. The method of claim 7, wherein color is determined by calculating the average DGCI value for the image.

12. The method of claim 7, wherein density of turfgrass is determined by calculating the number of shadows in the digital image.

13. The method of claim 7, wherein uniformity is determined by:
 scaling the digital image;
 grouping areas of similar color in the scaled image; and
 comparing the areas of similar color to the digital image.

14. A turfgrass analysis device comprising:
 (a) a storage device;
 (b) a processor in communication with the storage device; and
 (c) a display in communication with the processor,
 wherein the processor retrieves a digital image from the storage device, wherein the processor is configured to calculate turfgrass quality from green coverage, color, density of turfgrass, and uniformity of the digital image, and wherein the processor displays the digital image and turfgrass quality on the display.

15. The device of claim 14, wherein the digital image contains a contrasting frame.

16. The device of claim 14, wherein turfgrass quality is determined by a weighted average of measurements of green coverage, color, density of turfgrass, and uniformity.

17. The device of claim 16, wherein coverage is determined by
 setting a set of threshold values;
 removing pixels outside of the set of threshold values; and
 determining the number of green pixels relative to the total number.

18. The device of claim 16, wherein color is determined by calculating the average DGCI value for the image.

19. The device of claim 16, wherein density of turfgrass is determined by determining the number of shadows in the digital image.

20. The device of claim 16, wherein uniformity is determined by:
 scaling the digital image;
 grouping areas of similar color in the scaled image; and
 comparing the areas of similar color to the digital image.

* * * * *